United States Patent
Huang et al.

(10) Patent No.: US 9,932,519 B2
(45) Date of Patent: Apr. 3, 2018

(54) METHOD OF MAKING PARTICLES HAVING A RIDGE PORTION FOR USE AS PROPPANT

(71) Applicant: Schlumberger Technology Corporation, Sugar Land, TX (US)

(72) Inventors: Jiangshui Huang, Sugar Land, TX (US); Jose Alberto Ortega Andrade, Houston, TX (US); Bernhard Rudolf Lungwitz, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/945,795

(22) Filed: Nov. 19, 2015

(65) Prior Publication Data
US 2017/0145297 A1    May 25, 2017

(51) Int. Cl.
| C09K 8/80 | (2006.01) |
| C09K 8/62 | (2006.01) |
| B29C 47/00 | (2006.01) |
| B29L 31/00 | (2006.01) |

(52) U.S. Cl.
CPC ............ *C09K 8/80* (2013.01); *B29C 47/0011* (2013.01); *C09K 8/62* (2013.01); *B29L 2031/772* (2013.01); *C09K 2208/08* (2013.01)

(58) Field of Classification Search
None
See application file for complete search history.

(56) References Cited

U.S. PATENT DOCUMENTS

| 4,060,497 | A | 11/1977 | Huschka et al. |
| 5,500,162 | A | 3/1996 | Theisen et al. |
| 6,197,073 | B1 | 3/2001 | Kadner et al. |
| 8,562,900 | B2 | 10/2013 | Alary et al. |
| 8,657,002 | B2 | 2/2014 | Willberg et al. |
| 8,883,693 | B2 | 11/2014 | Eldred et al. |
| 2006/0016598 | A1 | 1/2006 | Urbanek |
| 2006/0162929 | A1 | 7/2006 | Urbanek |
| 2009/0137433 | A1 | 5/2009 | Smith et al. |
| 2012/0227968 | A1* | 9/2012 | Eldred ............... C09K 8/805 166/280.2 |
| 2012/0285693 | A1* | 11/2012 | Mirakyan ........... C09K 8/605 166/308.1 |

(Continued)

FOREIGN PATENT DOCUMENTS

| WO | 2011044612 A1 | 4/2011 |
| WO | 2015077130 A1 | 5/2015 |

OTHER PUBLICATIONS

International Search Report and Written Opinion issued in International Patent Appl. No. PCT/US2016/061733 dated Feb. 21, 2017; 12 pages.

*Primary Examiner* — Jeffrey Washville
(74) *Attorney, Agent, or Firm* — Andrea E. Tran

(57) ABSTRACT

A method for forming particles having a ridge portion includes inducing flow of a slurry of particles and a reactant through one or more orifices, detaching an amount of the slurry from the slurry flow following exit from the one or more orifices, the detached amount forming a slurry body, forming the slurry body into a particle shape, contacting the particle shaped slurry body with a coagulation solution to form a stabilized particle having the ridge portion, and drying and/or sintering the particle having the ridge portion.

10 Claims, 1 Drawing Sheet

(56) References Cited

U.S. PATENT DOCUMENTS

2015/0299559 A1* 10/2015 Weiss ................ C09K 8/80
166/278
2016/0272880 A1   9/2016 Barthelmess et al.

* cited by examiner

METHOD OF MAKING PARTICLES HAVING A RIDGE PORTION FOR USE AS PROPPANT

BACKGROUND

Hydrocarbons (such as oil, condensate, and gas) may be produced from wells that are drilled into formations containing them. For a variety of reasons, such as low permeability of the reservoirs or damage to the formation caused by drilling and completion of the well, or other reasons resulting in low conductivity of the hydrocarbons to the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

Hydraulic and acid fracturing treatments may include two stages. A first stage comprises pumping a viscous fluid, called a pad, that is typically free of proppants, into the formation at a rate and pressure high enough to break down the formation to create fracture(s) therein. In a subsequent second stage, a proppant-laden slurry is pumped into the formation in order to transport proppant into the fracture(s) created in the first stage. In "acid" fracturing, the second stage fluid may contain an acid or other chemical, such as a chelating agent, that can assist in dissolving part of the rock, causing irregular etching of the fracture face and removal of some of the mineral matter, which results in the fracture not completely closing when the pumping is stopped. Occasionally, hydraulic fracturing may be done without a highly viscosified fluid (such as water) to minimize the damage caused by polymers or the cost of other viscosifiers. After finishing pumping, the fracture closes onto the proppant, which keeps the fracture open for the formation fluid (e.g., hydrocarbons) to flow to the wellbore of the well. The performance characteristics of the proppant contribute to the overall effectiveness of the fracturing stimulation.

Proppant is typically made of materials such as sand, glass beads, ceramic beads, or other materials. Sand is used frequently as the proppant for fracture treatments. For fractures with high closure stress, such as greater than 6,000 pound per square inch (psi), in deep wells or wells with high formation forces, higher strength proppant is desired. The closure stress which sand can sustain is normally about 6,000 psi, so a closure stress over 6,000 psi would crush the sand into small pieces that reduces the width of the fracture and results in insufficient conductivity for oil and/or natural gas to flow. Furthermore, as the small pieces continually flow back during the production, the conductivity of the wells would reduce further which results in a short life span of the wells or results in refracturing having to be performed.

Ceramic proppant has been used to maintain the conductivity of wells with a high closure stress. Typically, the more the alumina ($Al_2O_3$) the proppant contains, the higher the closure stress the ceramic proppant can withstand, but also the higher the specific gravity of the proppant. A high specific gravity may lead to fairly rapid gravitational settling of the proppant, which results in difficulty to transport the proppant into the fracture, especially for fractures located far from the wellbore. Also, quick settling in the fracture leads to lack of proppant on the top part of a fracture, which reduces the productivity of the well.

High viscosity fracturing fluid, such as fluid containing a crosslinked polymer, may be used for transporting proppant with high specific gravity. However, fracture geometry, including width and height, is also affected by the fluid viscosity. High fluid viscosity leads to a large fracture width and may make the fracture excessively grow in height into a nonproductive or water-producing zone, impairing the efficiency of hydraulic fracturing.

To transport proppant of high specific gravity with fracturing fluid of a low viscosity, fiber has been added to the fluid as an additive. See, for example, U.S. Pat. No. 8,657,002, incorporated herein by reference in its entirety. To use fiber effectively for transporting proppant, the interaction force between fiber and proppant may have significance. For example, while a smooth surface and good sphericity are desired properties of a proppant particle in order to achieve high conductivity, these properties may result in a lower interaction force with fibers, which may require the use of a greater amount of fibers and, for stimulation techniques for geological formations that rely on proppant clusters/pillars to maintain the width of a fracture and channels for conducting the formation fluid, a lower interaction force between fiber and proppant may result in an increased tendency of spreading/collapse of the clusters under closure stress, which may reduce the channel size and/or eliminate channels. Retaining proppant surface smoothness and sphericity while achieving good interaction force between the proppant and the fiber is thus desirable.

The so-called drip-casting manufacturing technique has been adapted for the manufacture of spherical ceramic proppants. Drip-casting substitutes conventional ways of pelletizing (also called granulating) ceramic proppant such as using high intensity mixers and pan granulators. Vibration-induced dripping (or drip-casting) was first developed to produce nuclear fuel pellets. See U.S. Pat. No. 4,060,497. It has subsequently evolved into applications for metal and ceramic microspheres for grinding media, pharmaceuticals and food industry. An application of vibration-induced dripping to aluminum oxide spheres is described in U.S. Pat. No. 5,500,162. The production of the microspheres is achieved through vibration-provoked dripping of a chemical solution through a nozzle. The falling drops are surrounded by a reaction gas, which causes the droplet to gel prior to entering the reaction liquid (to further gel). Using a similar approach, U.S. Pat. No. 6,197,073 covers the production of aluminum oxide beads by flowing a sol or suspension of aluminum oxide through a vibrating nozzle plate to form droplets that are pre-solidified with gaseous ammonia before their drop into ammonia solution. U.S. Patent Application Publication No. 2006/0016598 describes the drip-casting to manufacture a high-strength, light-weight ceramic proppant. U.S. Pat. No. 8,883,693 describes the application of the drip-casting process to make ceramic proppant.

What is still desired, then, are ceramic proppants able to withstand high closure stress that have a low settling rate and high interaction force with fiber, while having a smooth surface and good sphericity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Described herein is a method for forming particles having a ridge portion, the method including inducing flow of a slurry comprised of particles and a reactant through orifice(s), detaching an amount of the slurry from the slurry flow following exit from the orifice(s), the detached amount forming a slurry body, forming the slurry body into a particle shape, contacting the particle shaped slurry body with a coagulation solution to form a stabilized particle having the ridge portion, and drying and/or sintering the particle having the ridge portion.

Also described are particles having a ridge portion, wherein the ridge portion includes a single protruding ring around an entire circumference of the particle, and wherein the particle has a curvature of a surface on one side of the protruding ring that is greater than the curvature of a surface on an other side of the protruding ring.

Also described is a fracture treatment fluid that includes a viscous fluid and the particles having a ridge portion as described herein.

DETAILED DESCRIPTION

Figure 1:
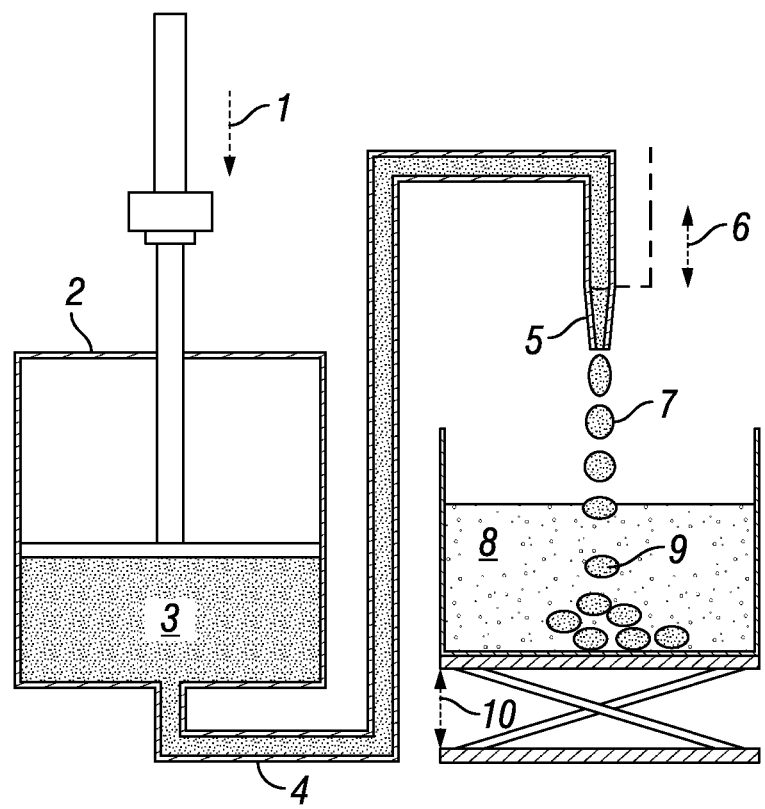
FIG. 1 is a schematic of an example apparatus for carrying out a method for making the particles having a ridge as described herein.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The present disclosure relates to methods of making particles having a ridge portion, to the particles made by the methods, and to treatment fluids that contain the particles having a ridge portion made by the methods, wherein the particles having a ridge portion may function as, for example, proppants and/or anti-flowback additives as proppants and/or anti-flowback additives.

While in embodiments the particles having a ridge portion are used in the context of a treatment fluid, for example as a proppant material and/or anti-flowback additive, it is not intended that the particles having a ridge portion as described herein be limited to being proppants and/or anti-flowback additives in such treatment fluids.

As used herein, the term "treatment fluid" refers to any pumpable and/or flowable fluid used in a subterranean operation in conjunction with a desired function and/or for a desired purpose. In some embodiments, the pumpable and/or flowable treatment fluid may have any suitable viscosity, such as a viscosity of from about 1 cP to about 10,000 cP, such as from about 10 cP to about 1000 cP, or from about 10 cP to about 100 cP, at the treating temperature, which may range from a surface temperature to a bottom-hole static (reservoir) temperature, such as from about 0° C. to about 150° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety) in a range of from about 1 $s^{-1}$ to about 1000 $s^{-1}$, such as a shear rate in a range of from about 100 $s^{-1}$ to about 1000 $s^{-1}$, or a shear rate in a range of from about 50 $s^{-1}$ to about 500 $s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

As used herein, a particle having a ridge portion refers to a particle having a transition point on the surface of the particle, which transition point results in a ridge portion on the surface of the particle.

Figure 2:
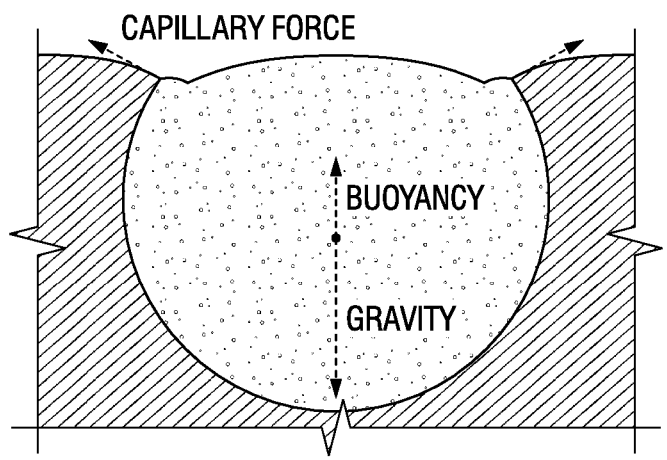
FIG. 2 is a side view of the shape of the particles having a ridge portion described herein, and further illustrates the force balance as the slurry body floats on the surface of the coagulation solution.

In embodiments, the transition point is an interruption in the continuity of the surface of the particle, which results in the particle having a ridged portion at the transition point. For example, the transition point is a point where two different portions of the particle surface meet without a smooth continuity, resulting in one portion of the surface protruding outwardly beyond the meeting point of the other portion of the surface to the one portion. In embodiments, the two different portions each have a different degree of curvature, and the portion with the lesser degree of curvature (i.e., the flatter curved surface) meets with the second portion at a point inside the radius of curvature of the second portion such that part of the surface of the second portion extends outward of the meeting point, resulting in a ridge portion. In other words, if the particle were a complete sphere, the one portion with the lesser degree of curvature would (1) lie within the diameter of the spherical particle surface, and (2) would not extend at either end of the arc of the one portion to meet the circumference of the sphere based upon the diameter of the spherical particle, thus resulting in a transitional ridge at the meeting point of the two portions. An example of this embodiment is shown in FIG. 2, the transition points having outwardly pointing arrows extending therefrom.

In embodiments, the transition point is an excess amount of ceramic material on the surface of the ceramic particle, resulting in a ridged protrusion of ceramic material at the transition point.

In embodiments, the ridge portion is characterized as a single ridge, or ring, such as a bumper ring, extending around the entire circumference of the surface of the particle.

In embodiments, the particle prior to formation of the ridge portion is substantially spherical or spheroidal, and thus these particles may be referred to herein as substantially spherical or spheroidal particles having a ridge portion. By substantially spherical or spheroidal herein is meant a particle with a fully convex boundary surface. These particles may also have a substantially constant aspect ratio, which is a ratio of the diameter of the particle along a major axis to the diameter of the particle along a minor axis, for example an aspect ratio of from 0.8:1 to 1.2:1 The particles prior to formation of the ridge portion may have other shapes as well, for example including an oblate shape or prolate shape with aspect ratios outside of the foregoing range.

In embodiments, the method for forming particles having a ridge portion comprises inducing flow of a slurry comprised of starting particles and a reactant through one or more orifices, detaching an amount of the slurry from the slurry flow following exit from the one or more orifices, the detached amount forming a slurry body, forming the slurry body into a particle shape, contacting the particle shaped slurry body with a coagulation solution to form a stabilized particle having the ridge portion, and drying and/or sintering the stabilized particle.

In embodiments, the method further comprises forming the slurry of particles and reactant by mixing. As the particles, the particles may be made of any suitable material, such as, for example, ceramic materials, sand, non-ceramic materials, composites of ceramic reinforced with additional stronger materials and the like. As the ceramic particles of the slurry, any suitable ceramic material may be used, for example glass and ceramic oxides such as alumina, bauxite, aluminum hydroxide, pseudo boehmite, kaolin, kaolinite, silica, silicates, clay, talc, magnesia and mullite. The ceramic particles may include alumina-containing particles or magnesium-containing particles. The ceramic particles may also be a composite particle that is comprised of ceramic reinforced with higher strength materials, which may be ceramic or non-ceramic, for example such as titanium carbide, carbon nanotubes or reinforcement elements such as fibers or polymers. Where the particles having a ridge portion may be used as a proppant that may need to withstand a higher fracture closure stress, for example of 6,000 psi or more, alumina-containing particles are desired because particles derived from alumina-containing particles have a higher strength and toughness. Typically, the higher the alumina ($Al_2O_3$) content, the higher the strength, hardness and toughness of the particles having a ridge portion. In embodiments, the ceramic particles may have an alumina content of from, for example, 5% to 95% by weight alumina, such as 20% to 75% by weight or 30% to 75% by weight.

While the starting particles may have any suitable size, an average size of less than 500 microns, such as an average size of 0.01 to 100 microns or 0.01 to 50 microns, may be desirable. The starting particles (i.e., the raw material for the end shaped particles) are desirably sized depending on the orifice diameter through which the slurry will pass in forming the shaped particles, and the orifice diameter may be equal to or greater than, for example, ten times the raw material particle average diameter.

The reactant in the slurry may be any material that can be coagulated, gelled and/or cross-linked by another material that is present in the coagulation solution. Reactants are typically organic materials used to stabilize the shape of the slurry once it is formed into the desired particle shape. The reactants thus react to form a stabilized solid or semi-solid shaped product once exposed to the coagulation solution. Examples of suitable reactants include, for example, polyvinyl alcohol, polyvinyl acetate, methylcellulose, dextrin, polysaccharides such as alginates, for example sodium alginate, and molasses. Sodium alginate is a naturally occurring polysaccharide that is soluble in water as the sodium salt, and is a suitable reactant in the methods described herein. The reactant may be included in the slurry in an amount of from 0.01% to 25%, such as 0.01% to 5% or 0.01% to 1% by weight of the slurry. The solids content of the slurry may be from, for example, 10% to 95%, such as 15% to 90% or 20% to 90%. The solids content may be adjusted so that the slurry has a suitable viscosity for flow through the one or more orifices, such as a viscosity of 1 to 10,000 cP measured at a shear rate of 100 (1/s).

The slurry may also contain one or more solvents. Possible solvents that can be used include water, alcohols, and ketones. Other additives may also be included in the slurry, such as lubricants and dispersants. Lubricants may include one or more of Manhattan fish oil, wax emulsions, ammonium stearates, and wax. Dispersants may include one or more of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt, as well as any surfactant.

The slurry is housed in a container that is associated with the one or more orifices. The slurry is induced to flow from the container to the one or more orifices by any suitable method. For example, the slurry may be induced to flow from the container by applying a load to a piston in the container housing the slurry to force the slurry out an exit port of the container that is associated with the one or more orifices. Also, increasing pressure in the container housing the slurry by any suitable method, and/or decreasing a volume of the container housing the slurry by any suitable method, to force the slurry to exit the container at a port associated with the one or more orifices may also be used. The slurry may also be pumped from the container housing the slurry to the one or more orifices associated with an exit of the container.

The exit port of the container may be connected to a pipe through which the slurry flows to the one or more orifices. Alternatively, the exit port may directly feed the slurry to the one or more orifices.

The one or more orifices may be comprised of a single orifice for making the shaped particles or may be comprised of multiple orifices that each makes shaped particles. Each orifice may be in the form of, for example, a nozzle or an opening in a membrane. Each orifice has a size that correlates with an end size desired for the shaped particles. The orifices thus may have a size of from, for example, 0.1 mm to 1 cm, depending on the approximate size desired for the end shaped particles.

The orifices are located above the coagulation solution. The apparatus may permit the height of the orifices from the coagulation solution to be adjusted, as the height that the slurry particles fall is a factor contributing to the final shape of the particles.

The coagulation solution comprises a coagulant that interacts with the reactant in the slurry to coagulate, gel and/or cross-link the reactant, thereby forming the slurry into a stabilized solid or semi-solid product. Thus, when particle of the slurry comes into contact with the coagulation liquid, the coagulation liquid interacts with the reactant in the slurry particle to stabilize the shape of the slurry particle. The slurry described herein is rather flowable and malleable prior to stabilization. Some examples of useful coagulation solution coagulants include, for example for use with sodium alginate as a reactant, a calcium salt solution such as calcium chloride at suitable concentration of calcium chloride, or an aluminum chloride hexahydrate solution. The amount of coagulant to include in the solution should desirably be sufficient at a minimum to coagulate, gel and/or cross-link the reactant and at a maximum should desirably not exceed the concentration that will dissolve into the solution. For example, a suitable concentration of the coagulant in the coagulation solution may be, for example, 0.1% to 25%, such as 0.1% to 10% by weight of the coagulation solution.

The slurry may be flowed through the orifices at any desirable rate. In embodiments, the slurry flow rate may be sufficiently slow that an amount of the slurry is able to separate from the slurry flow, after it has passed through an orifice, as a result of its own weight, similar to a drop of water separating from a water flow out of a tap. Depending on the viscosity of the slurry, a flow speed sufficient for this embodiment may be, for example, from 0.01 to 1 m/s for an alumina slurry made up of 75% by weight of solids and an orifice size of 0.37 mm in diameter.

In other embodiments, physical means may be used to separate the slurry into separate particle sized slurry bodies after it has passed through an orifice. For example, vibration energy may be applied to the one or more orifices to separate a particle sized slurry body from the slurry flow. Application of the vibration may be controlled such that it is applied at regular intervals based on the flow rate of the slurry in order to sever the slurry flow at the desired points such that separate particle sized bodies are formed. In this embodiment, the vibration energy is at a combination of sufficient frequency and amplitude to separate the slurry bodies from the slurry flow. A range of frequencies in this embodiment may be from 10-1,000 Hz for an alumina slurry made up of 75% by weight of solids and an orifice size of 0.37 mm in diameter. The vibration amplitude may be adjusted accordingly to achieve a desired size. The vibration action thus reduces the size of the slurry. The vibration energy can be applied in any direction, for example perpendicular or parallel to the axis of the orifice.

As the separated slurry body falls from the orifice to the coagulation solution, the slurry body transforms into the particle shape. When the slurry body falls into the coagulation solution, the reactant is promptly coagulated, or cross-linked, by the coagulant, which forms a stiff shell and stabilizes the slurry body in the particle shape. However, when the falling height between the orifices and the coagulation solution surface is small enough, the ceramic slurry body cannot penetrate the surface of solution due to a low kinetic energy, and thus the slurry body floats on the surface of the coagulation solution under the force-balance of capillary force, buoyancy, and gravity, as shown in FIG. 2. The part of the particle that is submerged in the coagulation solution undergoes stabilization, whereas the part of the particle outside of the solution does not crosslink/stabilize, therefore making that part of the particle still flowable or malleable. The capillary force exerts the mechanical deformation that creates the ridge. The falling height, defined as the distance from the orifice to the surface of the coagulation solution, may be controlled by a height adjuster.

In the above manner, the slurry bodies suspended on the surface of the coagulation solution are deformed by capillary action. The top part of the particle that does not immediately contact the coagulation solution, and thus is not promptly stabilized, is deformed due to the kinetic energy dissipated during the impacting process. This results in the ceramic particle having a ridge on its surface as detailed above. In FIG. 2, the ridge is a single ridge in the form of a ring bumper around the entire circumference of the particle surface. The ridge is located at the point of the particle surface where the portion in the coagulation solution and the portion floating above the coagulation solution met. The time scale of the formation of the ridge will depend on the kinematics of the mechanical deformation for the flowable/malleable part of the particle under capillary force action.

The falling height used to achieve the slurry bodies floating on the surface of the coagulation solution depends on the size of the end particle, the density and the rheological properties of the slurry. The ridge on the surface of the particle can be adjusted by the controlling the falling height, the capillary force and the density of the coagulation solution, and the size, density and rheological properties of slurry body. These values should be appropriately adjusted such that the slurry bodies of a given slurry composition are able to attain a desired shape while falling but still float on the surface of the coagulation solution in order to form the ridge portion. While one of ordinary skill in the art should be able to select the appropriate parameter values based on the foregoing description, the following additional description is given for additional guidance.

A sample slurry of 144 g water, 400 g ceramic raw powder (alumina-based), 1.6 g of sodium alginate, 0.8 g of dispersant (synthetic polyelectrolyte dispersing agent), 0.38 g of phosphate based surfactant and 0.48 g of lubricant (alkali-free pressing agent) was prepared and used for illustration. The density of the slurry is 2.2 g/cc, and the viscosity of the slurry at 100 (1/s) is about 300 cP. The coagulation solution was a 2 wt % of calcium chloride solution. An orifice size of 0.37 mm in diameter and a flowing speed of 0.25 m/s were employed. The falling height was set to 2 cm. To separate the slurry body from the orifice, a vibration frequency of 60 Hz was applied. The particles floated for approximately 1 min until the ridge was fully formed. The implementation of the process herein described resulted in ridged particles with a characteristic diameter of about 1 mm.

The stabilized particles having the ridge portion are collected from the coagulation solution by any suitable methodology. The collected stabilized particles are then dried using any suitable drying processes. For example, the stabilized particles may be subjected to air drying, or to drying using electric or gas driers. The stabilized particles may also be subjected to sintering, either as the drying step or as a separate step following drying. Sintering may be conducted at a temperature of from, for example, about 800° C. to about 2,300° C., such as from about 1,200° C. to about 1,700° C.

FIG. 1 is a schematic of an apparatus that may be used for carrying out the above-described methods. In FIG. 1, the slurry (3) housed in container (2) is forced to flow by applying a load (1) on a piston. When the load is applied to the slurry, the slurry is made to flow out an exit port at the bottom of the container and into tube or pipe (4) that is connected with an orifice (5). The orifice is located above a coagulation solution (8). The slurry exits and is separated into individual slurry bodies (7), the separation being effected in this apparatus through use of a mechanical device (6) that applies a vibrational energy to the orifice. As the slurry bodies enter into the coagulation solution, the bodies float on the surface of the coagulation solution (not shown) to form stabilized particles with the ridge portion (9). The height between the nozzle and the coagulation solution surface may be adjusted via height adjuster (10).

The particles produced by the methods described herein may have an average size (based on a largest diameter) of from 0.1 mm to 1 cm, for example from 0.1 mm to 5 mm or from 0.1 mm to 1 mm. The particles also have a narrow particle size distribution, for example a particle size distribution exhibiting differences between Dv10 and Dv90 values of less than 20%. The Dv-values correspond to standard percentile values obtained from the statistical analysis of the volume-based distribution. Dv10 is the particle size at which 10% (by volume) of the sample is smaller and 90% of the sample is larger. Similarly, Dv90 is the particle size below which 90% of the sample distribution lies.

The particles having a ridge portion as made by the methods described herein are able to exhibit a substantially smooth surface.

Where the particles having a ridge portion are used in a treatment fluid, for example as proppant, the defined ridge of the particles described herein may increase the interlocking ability/friction force of the particles with fibers by creating a defined high stress area (associated with the ridge) that latches onto the fibers, which could increase the capability of the fiber to transport the particles into the fracture during the fracturing treatment. This fiber-particle interlocking mechanism also could increase the strength of pillars when a fracture closes onto the pillars. Also, the conductivity of the proppant pack is not, or is minimally, compromised because the substantially smooth surface of the particles may minimize friction and turbulence of produced fluid/gases over the production. The defined ridge also may increase the friction force between the walls of the fracture and the particles, which decreases the settling of the particles in the fracture and increases the strength of the pillars. In addition, the particles having a ridge portion as described herein may be harder to flow back compared to spherical proppant. The particles can be used together with other shaped proppants as an anti-flowback additive. The particles can also be used together with fiber to achieve enhanced anti-flowback control.

In some embodiments, the concentration of the shaped particles in the treatment fluid may be any desired value, such as a concentration in the range of from about 0.01 to about 80% by weight of the treatment fluid, or a concentration in the range of from about 0.1 to about 25% by weight of the treatment fluid, or a concentration in the range of from about 1 to about 10% by weight of the treatment fluid.

Although the shaped particles may be used by themselves in the treatment fluid, for example as proppants for a fracture, they may also be used together with conventional proppants, for example with spherical proppant particles of glass, sand, ceramic and the like. Other proppant particles may be used in a weight ratio of the shaped particles to the other proppant particles of from 0.1:1 to 10:1. In some embodiments, other proppants may include sand, synthetic inorganic proppants, coated proppants, uncoated proppants, resin coated proppants, and resin coated sand. The proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated. The particles having a ridge portion may also be resin coated, where desired.

In some embodiments, the treatment fluids may also include a fibrous material, as well known in the art. Fibers may be included in the treatment fluid in order to assist in transport of proppants into the fractures. For example, the treatment fluid may comprise the particles having a ridge portion, optionally with substantially spherical or spheroidal particles, and a fiber of any desired thickness (diameter), density and concentration that is effective to assist in the downhole operation. The fibers may be one or more member selected from natural fibers, synthetic organic fibers, glass fibers, ceramic fibers, carbon fibers, inorganic fibers, metal fibers, a coated form of any of the above fibers.

Fibers may be used in bundles. The fibers may have a length in the range of from about 1 mm to about 30 mm, such as in the range of from about 5 mm to about 20 mm. The fibers may have any suitable diameter or cross dimension (shortest dimension), such as a diameter of from about 5 to 500 microns, or a diameter of from about 20 to 100 microns, and/or a denier of from about 0.1 to about 20, or a denier of from about 0.15 to about 6.

The fibers may be formed from a degradable material or a non-degradable material. The fibers may be organic or inorganic. Non-degradable materials are those wherein the fiber remains substantially in its solid form within the well fluids. Examples of such materials include glass, ceramics, basalt, carbon and carbon-based compound, metals and metal alloys. Polymers and plastics that are non-degradable may also be used as non-degradable fibers. Such polymers and plastics that are non-degradable may include high density plastic materials that are acid and oil-resistant and exhibit a crystallinity of greater than 10%. Degradable fibers may include those materials that can be softened, dissolved, reacted or otherwise made to degrade within the well fluids. Such materials may be soluble in aqueous fluids or in hydrocarbon fluids.

Suitable fibers may also include any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof.

The treatment fluid includes a carrier solvent that may be a pure solvent or a mixture. Suitable solvents may be aqueous or organic based. For example, the treatment fluid may include a carrier solvent and the substantially spherical or spheroidal particles. The fluid may be any suitable fluid, such as, for example, water, fresh water, produced water, seawater, or an aqueous solvent, such as brine, mixtures of water and water-soluble organic compounds and mixtures thereof. Other suitable examples of fluids include hydratable gels, such as guars, polysaccharides, xanthan, hydroxy-ethyl-cellulose; cross-linked hydratable gels, viscosified acid, an emulsified acid (such as with an oil outer phase), an energized fluid (including, for example, an $N_2$ or $CO_2$ based foam), and an oil-based fluid including a gelled, foamed, or otherwise viscosified oil. Suitable organic solvents that may act as a carrier solvent for the treatment fluids of the disclosure include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxyethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

Treatment fluids may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In some embodiments, the treatment fluid may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers that may be used as a viscosifying agent include polyvinyl polymers, polymethacrylamides, cellulose ethers, lignosulfonates, and ammonium, alkali metal, and alkaline earth salts thereof. Additional examples of other water soluble polymers that may be used as a viscosifying agent include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In some embodiments, the carrier fluid may optionally further comprise additional additives, including, for example, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

Although the preceding description has been set forth with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for forming particles having a ridge portion comprising:
   inducing flow of a slurry comprised of particles and a reactant through one or more orifices;
   detaching an amount of the slurry from the slurry flow following exit from the one or more orifices, the detached amount forming a slurry body;
   forming the slurry body into a particle shape;
   contacting the particle shaped slurry body with a coagulation solution to form a stabilized particle having the ridge portion form a single ring around an entire circumference of the particle, wherein the ridge portion has an average size of from 0.1 mm to 1 cm, and the ridge portion having a curvature of a surface on one side of the ring that is greater than the curvature of a surface on an other side of the ring; and
   drying and/or sintering the particle having the ridge portion.

2. The method according to claim 1, wherein the ridge portion is formed by the slurry body floating on a surface of the coagulation solution following the forming into a particle shape.

3. The method according to claim 1, wherein the inducing flow of the slurry is performed by applying a load to a piston in a container housing the slurry to force the slurry through the one or more orifices associated with an exit of the container, increasing pressure in the container housing the slurry to force the slurry through the one or more orifices associated with an exit of the container, decreasing a volume of the container housing the slurry to force the slurry through the one or more orifices associated with an exit of the container, or pumping the slurry from the container housing the slurry to force the slurry through the one or more orifices associated with an exit of the container.

4. The method according to claim 1, wherein the method further comprises forming the slurry prior to inducing flow of the slurry by mixing the reactant and the particles.

5. The method according to claim 1, wherein the detaching comprises controlling a flow rate of the slurry to permit the detaching to occur as a result of a weight of the amount of the slurry exited from the one or more orifices.

6. The method according to claim 1, wherein the detaching comprises applying a vibration energy to the one or more orifices to separate the amount of the slurry from the slurry flow.

7. The method according to claim 1, wherein the forming the slurry body into a particle shape comprises having the slurry body fall a height between the one or more orifices and the coagulation solution.

8. The method according to claim 1, wherein the particles are alumina-containing particles.

9. The method according to claim 1, wherein the reactant is an alginate and the coagulation solution comprises a calcium salt.

10. The method according to claim 1, wherein the one or more orifices comprise one or more nozzles or one or more openings of a membrane.

\* \* \* \* \*